US012782111B2

(12) United States Patent
Boosalis

(10) Patent No.: US 12,782,111 B2
(45) Date of Patent: Nov. 3, 2026

(54) METROLOGY DEVICE WITH WAVELENGTH-FREQUENCY MULTIPLEXING

(71) Applicant: Onto Innovation Inc., Wilmington, MA (US)

(72) Inventor: Alexander George Boosalis, Lake Oswego, OR (US)

(73) Assignee: Onto Innovation Inc., Wilmington, MA (US)

( * ) Notice: Subject to any disclaimer, the term of this patent is extended or adjusted under 35 U.S.C. 154(b) by 216 days.

(21) Appl. No.: 18/399,615

(22) Filed: Dec. 28, 2023

(65) Prior Publication Data

US 2025/0216189 A1 Jul. 3, 2025

(51) Int. Cl.
*G01B 9/02091* (2022.01)
*G01B 9/02* (2022.01)
(Continued)

(52) U.S. Cl.
CPC ...... *G01B 9/02091* (2013.01); *G01B 9/02011* (2013.01); *G01B 9/02045* (2013.01);
(Continued)

(58) Field of Classification Search
CPC .............. G01B 9/0209; G01B 9/02091; G01B 9/02045; G01B 9/02002; G01B 9/02011;
(Continued)

(56) References Cited

U.S. PATENT DOCUMENTS

| | | | |
|---|---|---|---|
| 7,221,451 | B2 | 5/2007 | Ohtake et al. |
| 7,239,392 | B2 | 7/2007 | Chism, II |

(Continued)

FOREIGN PATENT DOCUMENTS

| | | |
|---|---|---|
| CN | 114047521 A | 2/2022 |
| TW | 201321729 A | 6/2013 |

OTHER PUBLICATIONS

John H. Scofield; Frequency-domain description of a lock-in amplifier. Am. J. Phys. Feb. 1, 1994; 62 (2): 129-133. https://doi.org/10.1119/1.17629 (Year: 1994).*

(Continued)

*Primary Examiner* — Kara E. Geisel
*Assistant Examiner* — Jonathon Cook
(74) *Attorney, Agent, or Firm* — Paradice & Li LLP

(57) ABSTRACT

An optical metrology device collects data in parallel by multiplexing wavelength and associated frequencies using computer control and electro-optics in a wavelength modulator. The wavelength modulator includes a pair of crossed polarizers and an electro-optical modulator, such as a Pockels cell or Faraday rotator, disposed between the polarizers. The electro-optical modulator modulates the polarization state of the light in response to a control signal and produces a different amount of polarization rotation for each wavelength in response to each value of the control signal. The control signal causes the electro-optical modulator to modulate the plurality of wavelengths in the light at different frequencies resulting in the production of a wavelength-frequency multiplex from the wavelength modulator. The effect of the sample on the wavelength-frequency multiplex may be used to determine one or more characteristics of the sample.

16 Claims, 5 Drawing Sheets

(51) Int. Cl.

| | |
|---|---|
| ***G01B 9/02001*** | (2022.01) |
| ***G01J 3/02*** | (2006.01) |
| ***G01J 3/45*** | (2006.01) |
| ***G01N 21/21*** | (2006.01) |

(52) U.S. Cl.
CPC ............... *G01J 3/0224* (2013.01); *G01J 3/45* (2013.01); *G01N 21/211* (2013.01); *G01B 2290/70* (2013.01); *G01N 2021/213* (2013.01)

(58) Field of Classification Search
CPC ...... G01B 2290/70; G01J 3/45; G01J 3/4531; G01J 3/0224; G01J 3/12; G01J 3/2889; G01J 3/433; G01J 3/4338; G01N 21/211; G01N 2021/213
See application file for complete search history.

(56) References Cited

U.S. PATENT DOCUMENTS

| | | | | |
|---|---|---|---|---|
| 7,502,111 | B2 | 3/2009 | Gibbs | |
| 7,738,115 | B2 | 6/2010 | Ocelic et al. | |
| 8,149,492 | B2 | 4/2012 | Ghidini et al. | |
| 8,760,752 | B2 | 6/2014 | Chen et al. | |
| 8,896,832 | B2 | 11/2014 | Hill et al. | |
| 9,400,246 | B2 | 7/2016 | Shchegrov et al. | |
| 9,583,907 | B2 | 2/2017 | Boland et al. | |
| 9,903,808 | B2 | 2/2018 | Plusquellic et al. | |
| 10,215,688 | B2 | 2/2019 | Shchegrov et al. | |
| 10,816,649 | B1 | 10/2020 | Keyser et al. | |
| 10,871,554 | B1 * | 12/2020 | Keyser | G01S 17/06 |
| 10,901,241 | B1 | 1/2021 | Antonelli et al. | |
| 2004/0218172 | A1 | 11/2004 | DeVerse et al. | |
| 2010/0053633 | A1 * | 3/2010 | Jansen | G01B 9/02011 356/491 |
| 2011/0188800 | A1 | 8/2011 | Futami | |
| 2016/0077403 | A1 | 3/2016 | Metcalf et al. | |
| 2017/0250775 | A1 | 8/2017 | Kato et al. | |
| 2018/0052099 | A1 | 2/2018 | Hill et al. | |
| 2021/0033788 | A1 | 2/2021 | Wang et al. | |
| 2021/0072616 | A1 | 3/2021 | Zhang et al. | |
| 2021/0341379 | A1 * | 11/2021 | Berezhna | G01N 15/1459 |
| 2023/0106481 | A1 | 4/2023 | Pawlowski et al. | |
| 2023/0108409 | A1 * | 4/2023 | Deliwala | G01N 21/31 382/128 |
| 2023/0228800 | A1 * | 7/2023 | Owens | G02F 1/0311 324/629 |

OTHER PUBLICATIONS

Walter C. Michels, Norma L. Curtis; A Pentode Lock-In Amplifier of High Frequency Selectivity. Rev. Sci. Instrum. Sep. 1, 1941; 12 (9): 444-447. https://doi.org/10.1063/1.1769919 (Year: 1941).*

Nathalie Picqué and Theodor W. Hansch, Frequency comb spectroscopy, Nature Photonics 13, 146••-157 (2019) https://doi.org/10.1038/s41566••-018••-0347-•-5.

Meadowlark Optics, Inc., "Basic Polarization Techniques and Devices," 1998, 6 pages, https://www.jlab.org/accel/inj_group/laserparts/Basic_Polarization_Techniques.pdf.

Metcalf, A. ; Torres Company, V. ; Leaird, D. (2013) "High-Power Broadly Tunable Electrooptic Frequency Comb Generator". Ieee Journal of Selected Topics in Quantum Electronics, vol. 19(6), 8 pages, http://dx.doi.org/10.1109/jstqe.2013.2268384.

"Application Note: Practical Uses and Applications of Electro-Optic Modulators," 8 pages, downloaded Jan. 31, 2023, https://www.newport.com/n/practical-uses-and-applications-of-electro-optic-modulators.

International Search Report and Written Opinion dated Apr. 14, 2025, from PCT/US2024/060417, filed Dec. 16, 2024.

* cited by examiner

METROLOGY DEVICE WITH WAVELENGTH-FREQUENCY MULTIPLEXING

FIELD OF THE DISCLOSURE

The subject matter described herein is related generally to optical metrology, and more particularly to spectroscopic optical metrology.

BACKGROUND

Semiconductor and other similar industries often use metrology, such as optical metrology or X-ray metrology, to provide non-contact evaluation of samples during processing. In optical metrology, a sample under test is illuminated with light, e.g., at normal or oblique incidence, and the resulting light is detected and analyzed to determine one or more characteristics of the sample. Optical metrology may use light that includes a plurality of wavelengths to generate a spectroscopic signal. With advanced metrology tools, it is desirable to increase the amount of data collected in the shortest possible time.

SUMMARY

An optical metrology device is configured to collect data in parallel by multiplexing wavelengths without the use of moving parts through the use of computer control and electro-optics. A wavelength modulator in the optical metrology device, for example, may simultaneously modulate the intensity of each wavelength at a unique frequency, resulting in a wavelength-frequency multiplex. The wavelength modulator includes a pair of crossed polarizers and an electro-optical modulator, such as a Pockels cell or Faraday rotator, disposed between the polarizers. The electro-optical modulator modulates the polarization state of light in response to a control signal and produces a different amount of polarization rotation for each wavelength in response to each value of the control signal. The control signal causes the electro-optical modulator to modulate the intensity of the plurality of wavelengths in the light at unique frequencies producing a wavelength-frequency multiplex. The effect of the sample on the wavelength-frequency multiplex may be used to determine one or more characteristics of the sample.

In one implementation, an optical metrology device includes a light source that produces light having a plurality of wavelengths. The optical metrology further includes a wavelength modulator that receives the light having the plurality of wavelengths. The wavelength modulator includes a pair of crossed polarizers and an electro-optical modulator that is disposed between the pair of crossed polarizers and that modulates a polarization state of the light in response to a control signal. The electro-optical modulator produces a different amount of rotation in polarization state for each wavelength in the light in response to each value of the control signal. The optical metrology further includes a modulation controller that is communicatively coupled to the electro-optical modulator and provides the control signal to the electro-optical modulator to modulate the plurality of wavelengths in the light at different frequencies to produce a wavelength-frequency multiplex. The optical metrology further includes illumination optics and collection optics configured to direct the light from the wavelength modulator to be incident on a sample and to collect at least a portion of the resulting light from the sample. A detector is used to detect the intensity of the resulting light. The optical metrology device includes at least one processor that is coupled to the detector and is configured to determine one or more parameters of the sample based on a wavelength-frequency multiplex spectrum in the resulting light.

In one implementation, a method performed by an optical metrology device includes producing light having a plurality of wavelengths and modulating the plurality of wavelengths in the light at different frequencies to produce a wavelength-frequency multiplex. The plurality of wavelengths in the light are modulated using a wavelength modulator that receives the light having the plurality of wavelengths and includes a pair of crossed polarizers and an electro-optical modulator disposed between the pair of crossed polarizers. The electro-optical modulator modulates a polarization state of the light in response to a control signal from a modulation controller. The electro-optical modulator produces a different amount of rotation in polarization state for each wavelength in the light in response to each value of the control signal. The method further includes directing the light from the wavelength modulator to be incident on a sample and collecting at least a portion of the resulting light from the sample. The method further includes detecting the intensity of the resulting light with a detector. The method performed by an optical metrology device further includes determining one or more parameters of the sample based on a wavelength-frequency multiplex spectrum in the resulting light.

DETAILED DESCRIPTION

Figure 1:
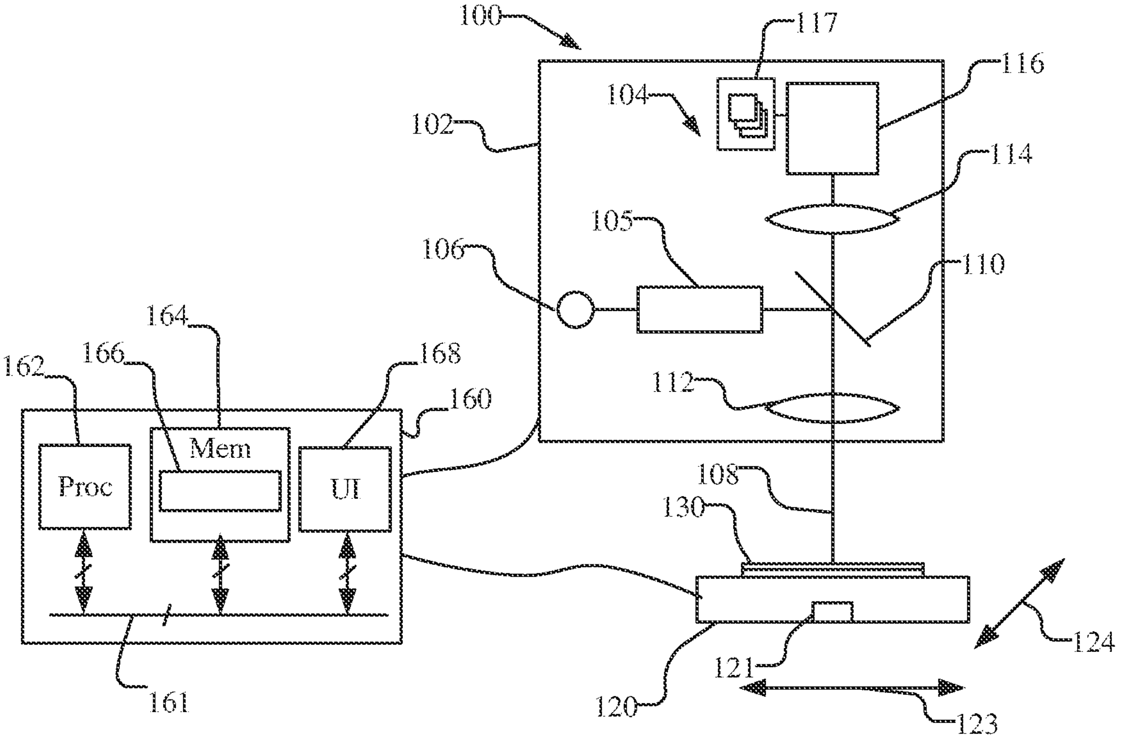
FIG. 1 shows a schematic view of a metrology device that is configured to modulate the wavelengths in light at different frequencies to produce a wavelength-frequency multiplex, as discussed herein.

During fabrication of semiconductor and similar devices it is often necessary to monitor the fabrication process by non-destructively measuring the devices. One type of metrology that may be used for non-destructive measurement of samples during processing is optical metrology, which may use radiation at normal or oblique incidence and may use a single wavelength or multiple wavelengths.

With advanced metrology tools it is important to increase the amount of data collected in the shortest possible time. Spectroscopic metrology uses multiple wavelengths to increase the amount of data collected. Conventionally, spectroscopic systems use gratings to separate and detect different wavelengths. The separated wavelengths may either be focused through a slit to a single detector or spread across a detector array, such as a charge-coupled device (CCD). Processing multiple frequencies with a single detector or from an entire detector array, however, requires time and therefore effects throughput. Additionally, to operate properly and provide useful measurements, many conventional metrology systems, such as white light interferometers, require precise alignment of optical components and precision movement, both of which are sensitive to mechanical vibration and machining tolerances.

As discussed herein, the amount of data collected in parallel for any light based metrology system may be increased by multiplexing the wavelength to frequency dependence in time. Modulating the input wavelengths to lower frequencies may be performed using fast computer control and electro-optics, which have no moving parts. An optical metrology device, for example, may use a wavelength modulator that receives the light having a plurality of wavelengths and modulates the light to produce a wavelength-frequency multiplex, which produces light having a spread of the photon energy (which equivalent to wavelength) that is dependent on frequency. The spread may have an equal or predictable spacing in photon energy. The wavelength modulator may include a pair of crossed polarizers and an electro-optical modulator that is disposed between the pair of crossed polarizers. The pair of crossed polarizers would prevent any light from passing through the system if the electro-optical modulator were not disposed between the pair of crossed polarizers. The electro-optical modulator, such as a Pockels cell or Faraday rotator, modifies a polarization state of the light in response to a control signal, which enables light to pass through the pair of crossed polarizers. The electro-optical modulator is wavelength dependent, i.e., there is a difference in the amount of rotation of the polarization state for each wavelength. A modulation controller generates and provides the control signal to the electro-optical modulator to modulate the light, but due to the wavelength dependence the wavelength modulator modulates the wavelengths at different frequencies, thereby producing a wavelength-frequency multiplex. After the light interacts with a sample under test and its intensity is detected by a detector, one or more parameters of the sample may be determined based on the wavelength-frequency multiplex spectrum.

FIG. 1 shows a schematic view of an optical metrology device 100, including an optical head 102 that is coupled to a computing system 160, and is configured to modulate the wavelengths in light at different frequencies to produce a wavelength-frequency multiplex, as discussed herein. The optical metrology device 100 illustrated in FIG. 1 is a normal incidence system and may be, e.g., spectroscopic reflectometer, white light interferometer, or any other normal incidence, spectroscopic, optical metrology device. It should be understood, however, that the optical metrology device may be an oblique incidence system, such as a spectroscopic ellipsometer or any other oblique incidence, spectroscopic, optical metrology device.

The optical head 102 include an optical system 104 including a broadband light source 106, such as a Xenon Arc lamp and/or a Deuterium lamp, that produces light having a plurality of wavelengths. A wavelength modulator 105 receives the light and a control signal from a modulation controller that may be part of or may be separate from the computing system 160. As discussed further in reference to FIG. 2, the wavelength modulator 105 may include a pair of crossed polarizers and an electro-optical modulator that is disposed between the pair of crossed polarizers. The electro-optical modulator alters a polarization state of the light in response to the control signal and is wavelength dependent, i.e., the alteration of the polarization state induced by the electro-optical modulator differs for each wavelength. The wavelength modulator 105 modulates the light at a specific frequency in response to a control signal and due to the wavelength dependence of the wavelength modulator 105, the wavelengths are modulated at different frequencies thereby producing a wavelength-frequency multiplex.

The optical head 102 further includes a detector 116 that receives the light reflected from sample 130 and detects the intensity of the light that includes the wavelength-frequency multiplex, which may be used to determine one or more parameters of the sample 130. In some implementations, the optical head 102 may further include one or more lock-in amplifiers 117 coupled to the detector 116 and that are used to lock on to a corresponding one or more frequencies in the wavelength-frequency multiplex in the received light. In operation, light produced by the light source 106 is modulated by wavelength modulator 105 to generate the wavelength-frequency multiplex and is directed along an optical axis 108, e.g., via beam splitter 110, toward the sample 130. An objective 112 focuses the light onto the target sample 130 and receives light that is reflected from the sample 130. The reflected light may pass through the beam splitter 110 and is focused with lens 114 onto the detector 116. The detector 116 provides a data signal to the computing system 160. The objective 112, beam splitter 110, lens 114, and detector 116 are merely illustrative of typical optical elements that may be used. Additional optical elements, such as a polarizer and/or analyzer, may be used if desired. Moreover, generally, additional optical elements such as field stops, lenses, etc. may be present in the optical system 104.

The computing system 160 may be configured to analyze the data received from the detector 116 to determine one or more parameters of the sample. The computing system 160 may be further configured to control the movement of a stage 120 that holds the sample 130 via actuators 121 and/or the optical head 102. The stage 120 may be capable of horizontal motion in either Cartesian (i.e., X and Y) coordinates, as indicated by arrows 123 and 124, or Polar (i.e., R and θ) coordinates or some combination of the two. The stage 120 and/or optical head 102 may also be capable of vertical motion, e.g., for focusing. The computing system 160, for example, may be a workstation, a personal computer, central processing unit or other adequate computer system, or multiple systems. It should be understood that the computing system 160 may be a single computer system or multiple separate or linked computer systems, which may be interchangeably referred to herein as computing system 160, at least one computing system 160, one or more computing systems 160. The computing system 160 may be included in or is connected to or otherwise associated with optical metrology device 100. Different subsystems of the optical metrology device 100 may each include a computing system that is configured for carrying out steps associated with the associated subsystem. The computing system 160 may be communicatively coupled to the detector 116 in any manner known in the art. For example, the computing system 160 may be coupled to a separate computing system that is associated with the detector 116. The computing system 160 may be configured to receive and/or acquire metrology data or information from one or more subsystems of the optical metrology device 100, e.g., the detector 116, by a transmission medium that may include wireline and/or wireless portions. The transmission medium, thus, may serve as a data link between the computing system 160 and other subsystems of the optical metrology device 100.

The computing system 160 includes at least one processor 162 with memory 164, as well as a user interface (UI) 168, which are communicatively coupled via a bus 161. The memory 164 or other non-transitory computer-usable storage medium, includes computer-readable program code 166 embodied thereof and may be used by the computing system 160 for causing the one or more computing systems 160 to control the optical metrology device 100 and to perform the functions discussed herein, including generating and providing a control signal to the wavelength modulator 105 to produce the wavelength-frequency multiplex, and to detect the intensity of resulting signals from the sample. Wavelength data may be determined from the wavelength-frequency multiplex in the resulting signals, e.g., using the lock-in amplifiers 117 or by performing a Fourier transform on the wavelength-frequency multiplex in the resulting signals. Parameters of the sample 130 may be determined based on properties of the wavelength-frequency multiplex, e.g., the extracted wavelength data. By way of example, the wavelength-frequency multiplex in resulting light for different sample parameters may be modeled and compared to the detected wavelength-frequency multiplex, e.g., using non-linear regression process or other appropriate processes, until a good fit is achieved to determine one or more parameters of the sample.

The preliminary structural and material information for a sample may include the type of structure and a physical description of the sample with nominal values for various parameters, such as layer thicknesses, line widths, space widths, sidewall angles, etc., along with a range within which these parameters may vary. The sample may further include one or more sample parameters that are not variable, i.e., are not expected to change in a significant amount during manufacturing. Typically, a library of modeled data for a plurality of parameter variations in the model may be pre-generated to increase measurement throughput, or the modeled data may be calculated in real time. The measured data is compared to the modeled data for each parameter variation, e.g., in a nonlinear regression process, until a good fit is achieved between the modeled data and the measured data, e.g., which may be determined based on the means square error (MSE). When a good fit between the measured data and the modeled data is achieved, the model parameters corresponding to the modeled data may be considered to be an accurate representation of the parameters of the structure under test.

The memory 164 may further include computer-readable program code 166 or instructions for causing the processor 162 to analyze the data to determine one or more parameters of the sample 130 based on the received signals. The results of the analysis of the data, e.g., to characterize the parameters of a sample 130 may be reported, e.g., stored in memory 164 associated with the sample 130 and/or indicated to a user via UI 168, an alarm or other output device. Moreover, the results from the analysis may be reported and fed forward or back to the process equipment to adjust the appropriate fabrication steps to compensate for any detected variances in the fabrication process. The computing system 160, for example, may include a communication port that may be any type of communication connection, such as to the internet or any other computer network. The communication port may be used to receive instructions that are used to program the computing system 160 to perform any one or more of the functions described herein and/or to export signals, e.g., with measurement results and/or instructions, to another system, such as external process tools, in a feed forward or feedback process in order to adjust a process parameter associated with a fabrication process step of the samples based on the measurement results.

The data structures and software code for automatically implementing one or more acts described in this detailed description can be implemented by one of ordinary skill in the art in light of the present disclosure and stored, e.g., on a computer-usable storage medium, e.g., memory 164, which may be any device or medium that can store code and/or data for use by the computing system 160. The computer-usable storage medium may be, but is not limited to, include read-only memory, a random access memory, magnetic and optical storage devices such as disk drives, magnetic tape, etc. Additionally, the functions described herein may be embodied in whole or in part within the circuitry of an application specific integrated circuit (ASIC) or a programmable logic device (PLD), and the functions may be embodied in a computer understandable descriptor language which may be used to create an ASIC or PLD that operates as herein described.

In some implementations, the wavelength modulator 105, shown in FIG. 1, may be used in a broadband metrology system that measures each wavelength independently, e.g., using a single detector 116. By way of example, in a conventional reflectometer, a diffraction grating, slit and photocell are used to detect wavelengths independently. The grating, for example, rotates and different wavelengths pass through the slit one at a time while the photocell records the intensity of each wavelength. In this example of a conventional system, the wavelengths are measured at different times, i.e., the grating rotates between measurement of each wavelength. With use of the wavelength modulator 105, the wavelengths may be measured simultaneously as a function of frequencies in the wavelength-frequency multiplex. Accordingly, with use of the wavelength modulator 105, a plurality of wavelengths may be quickly measured with no moving parts, while a conventional system would require a significantly longer time for measurement along with physically movement of the grating.

Additionally, in a narrowband metrology system that uses a detector that is sensitive to multiple wavelengths, the wavelength modulator 105 (and broadband light source 106) may be used to easily upgrade the system to measure multiple wavelengths instead of a single wavelength.

In an imaging metrology system, the wavelength modulator 105 may be used to additionally measure wavelength information. For example, many spectroscopic tools use a grating and an array detector, e.g., CCD, CMOS, linear photocell array, etc., to detect multiple wavelengths simultaneously. However, in such a system, if the array detector is used to acquire an image, i.e., detect position, it cannot be used to also detect separate wavelength information. By replacing the grating in such an imaging metrology system with the wavelength modulator 105, the detector array intensities may be measured with respect to time to acquire wavelength data at every position. Thus, wavelength data is acquired in addition to the image position information.

Additionally, the wavelength modulator 105 may be used advantageously in a broadband metrology system in a noisy environment, which may be thermal, mechanical (vibration), electrical, or even light source fluctuation noise. For example, as long as the noise is not oscillating at the same frequencies produced by the wavelength modulator 105, the wavelength modulator 105 may be used to separate the noise in the signal, enabling a clean measurement. Moreover, as the wavelength modulator 105 is electronically controlled, it may operate faster than conventional mechanical systems used to reduce noise.

Figure 2:
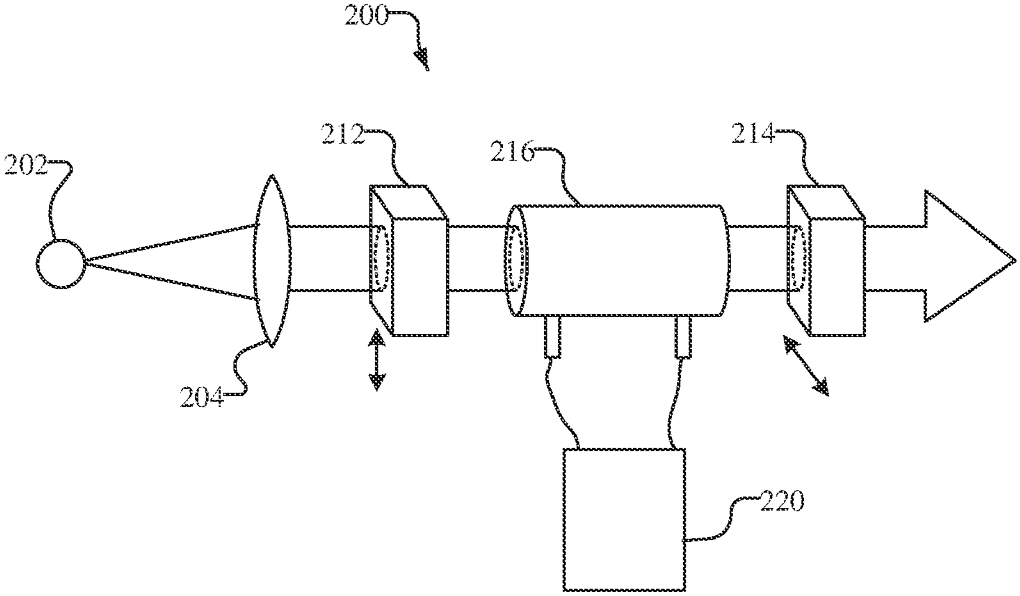
FIG. 2 shows a schematic view of a wavelength modulator that modulates the wavelengths in light at different frequencies to produce a wavelength-frequency multiplex.

FIG. 2 shows a schematic view of a wavelength modulator 200 that modulates the wavelengths in light at different frequencies to produce a wavelength-frequency multiplex. Wavelength modulator 200 may be used as the wavelength modulator 105 shown in FIG. 1. The wavelength modulator 200 includes a pair of cross polarizers 212 and 214 and an electro-optical modulator 216 that is disposed between the pair of crossed polarizers 212 and 214 and is coupled to receive control signals from a modulation controller 220.

Light generated by a broadband light source 202, which may be used as light source 106 shown in FIG. 1, is collimated by one or more lenses 204 and received by the wavelength modulator 200. A first polarizer 212 of the pair of crossed polarizers, which may be a linear polarizer, passes light with a first polarization state, e.g., +45 degrees. The polarized light passes through the electro-optical modulator 216 and is received by a second polarizer 214 of the pair of crossed polarizers, which may also be a linear polarizer, but is configured to pass light with a second polarization state that is orthogonal to the first polarization state, e.g., −45 degrees. The electro-optical modulator 216 modifies the polarization state of the light received from the first polarizer 212 in response to the control signal received from the modulation controller 220.

The electro-optical modulator 216, for example, is configured to rotate the polarization state of the light transmitted by the electro-optical modulator 216 between 0 and 90 degrees across the entire spectrum of interest in response to the control signal. The pair of crossed polarizers 212 and 214, without the intervening electro-optical modulator 216, would prevent any light from passing through the system, e.g., +45 degree polarized light from the first polarizer 212 will be rejected by second polarizer 214 which passes −45 degree polarized light. With the presence of the electro-optical modulator 216, which is configured to rotate the polarization state between 0 and 90 degrees, the transmission of light through the second polarizer 214 may be controlled to vary between a minimum and a maximum.

The electro-optical modulator 216, for example, may be, e.g., a Pockels cell, which is any crystal that will change its refractive index linearly with the application of an electric field (the linear electro-optic effect) thereby retarding the phase in the light. In response to a control signal with a variable voltage, the Pockels cell will vary the phase delay in the light that it transmits. The Pockels cell may be configured to vary the retardance between a half wave and a full wave, which rotates the polarization state between 0 and 90 degrees. In another arrangement, the Pockels cell may be configured to produce up to a quarter wave retardation, which may be combined with a static quarter wave retarder to rotate the polarization state by 90 degrees in the light that is transmitted.

In another example, the electro-optical modulator 216 may be, e.g., a Faraday rotator that rotates the polarization state of transmitted light in response to a magnetic field (the Faraday effect). In some implementations, a Faraday rotator may be one or more ferromagnetic crystals, or other element that produces a Faraday rotation, such as any material with a non-zero Verdet constant, which may even include gases. The Faraday rotator may be surrounded by an electromagnet that may vary the magnetic field applied to the Faraday rotator in response to the variable control signal to vary the polarization state in the light that is transmitted.

The modulation controller 220 may be a computer controlled driver that provides a varying control signal at a desired frequency or frequencies to the electro-optical modulator 216 to produce the 90 degree polarization rotation across the entire spectrum of interest. The control signal may be a voltage signal, e.g., if the electro-optical modulator 216 is a Pockels cell, or may be a current signal, e.g., if the electro-optical modulator 216 is a Faraday rotator with a surrounding electromagnet. The modulation controller 220 may be part of computing system 160 shown in FIG. 1 or may be separate from and controlled by the computing system 160.

The electro-optical modulator 216 is wavelength dependent and rotates the polarization state of each wavelength by differing amounts for each control signal value. The wavelength dependence of conventional Pockels cells and Faraday rotators has previously been considered a hinderance to developing broadband technologies for optical metrology. As discussed herein, however, the wavelength dependence may be used advantageously to modulate each wavelength at a different frequency in response to a varying control signal thereby producing a wavelength-frequency multiplex, which may be used to determine parameters of a sample. The use of a wavelength-frequency multiplex in optical metrology enables the collection of a large amount of data by multiplexing the wavelength dependence in time with no moving parts to avoid mechanical vibration.

Figure 3:
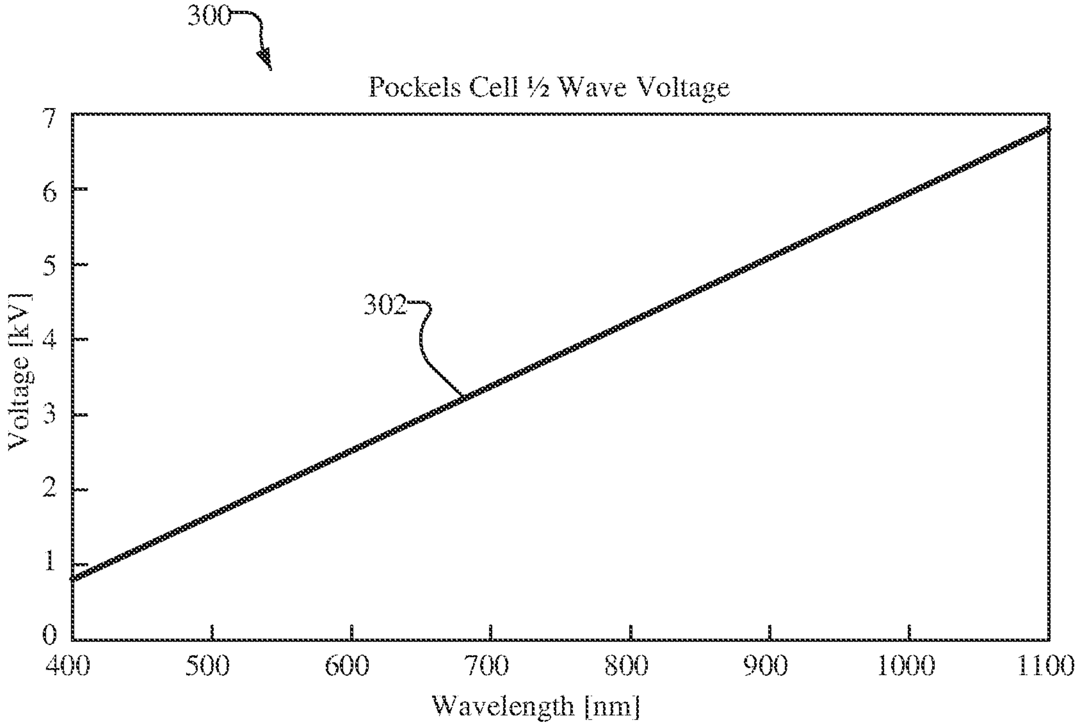
FIG. 3 shows a graph illustrating the half wave voltage per wavelength for an Pockels cell in the wavelength modulator.

FIG. 3, by way of example, is a graph 300 illustrating the half wave voltage per wavelength for potassium dihydrogen phosphate (KDP), which is an electro-optic crystal that may be used in a Pockels cell implementation of the electro-optical modulator 216. The line 302 in the half wave voltage graph 300 illustrates the voltage of the control signal that generates a half wave retardance in the electro-optical modulator 216 for each wavelength. It should be understood that while graph 300 illustrates half wave voltage for a Pockels cell, a wavelength dependence is also found for the polarization rotation produced by a Faraday rotator. The wavelength dependence for a Faraday rotator, however, is not linear as illustrated in FIG. 3, but is roughly exponential.

As can be seen in FIG. 3, due to the wavelength dependence, for every wavelength the half wave voltage is different, so that each wavelength will be modulated at a different frequency. The wavelength-frequency multiplex data may be collected by the detector 116 (shown in FIG. 1) with respect to time and a Fourier transform may be performed to detect the harmonics of the driving frequency of the electro-optical modulator 216. Each harmonic will correspond to a narrow range of wavelengths (or photon energies). The Fourier transform does not contain a continuous spectrum because the electro-optical modulator 216 has a maximum value of the control signal (voltage or current) that can be applied before breaking down. For example, if the electro-optical modulator 216 is a Pockels cell, a maximum voltage may be applied before the Pockels cell breaks down. Similarly, if the electro-optical modulator 216 is a Faraday rotator, a maximum magnetic field produced in response to the control signal may be applied before the Faraday rotator becomes current limited. In the case of a Faraday rotator, there is no "breakdown voltage" since it is a current based device, but the coil itself can only withstand a certain amount of current before it fails, e.g., the wire may break due to current migration or the coil may crush itself. Additionally, the modulation controller 220 has a maximum current that it can use. Staying within a safe operating range results in some wavelengths experiencing a perfect cycle within the control signal swing, while other wavelengths experience a phase discontinuity. The phase discontinuity will limit the Fourier response.

Figure 4:
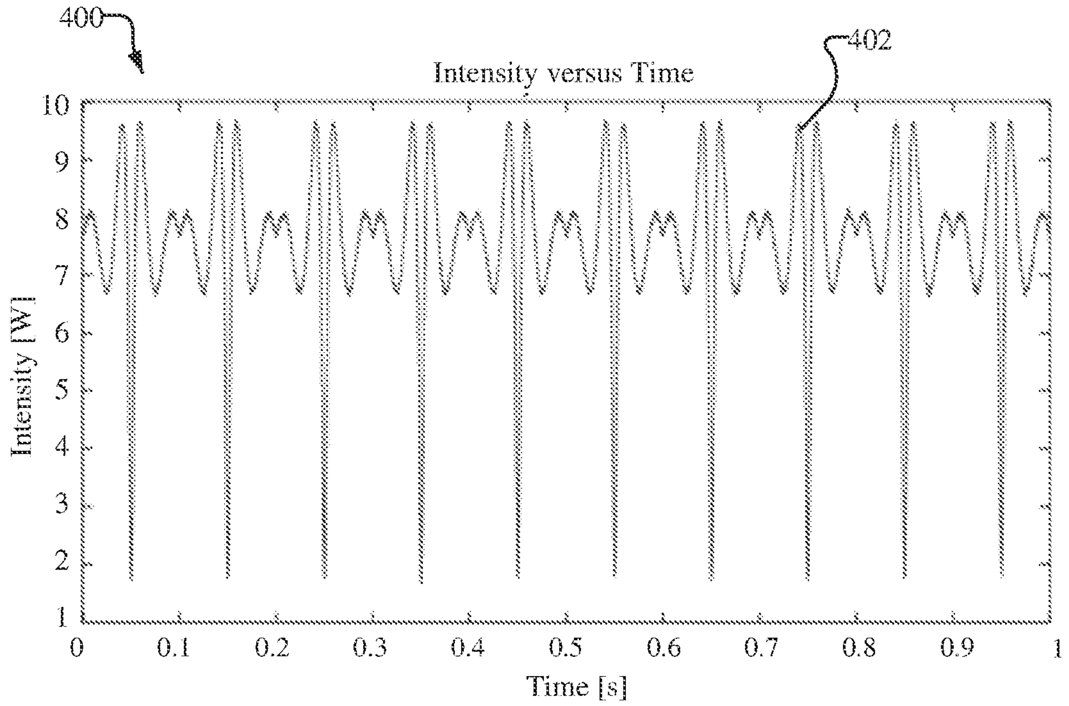
FIG. 4 shows a graph illustrating a simulation of the output signal of a detector receiving wavelength modulated light produced by the wavelength modulator.

FIG. 4, by way of example, is a graph 400 illustrating a simulation of the output signal 402 of detector 116 due to the wavelength modulator 200 producing a wavelength-frequency multiplex in response to varying control signal with a specific frequency. Graph 400 illustrates the intensity with respect to time of the detected signal. Due to the limited range of the control signal, which is limited to avoid break down of the electro-optical modulator 216, the output signal 402 is a repeating signal. The output signal 402 was simulated using a Pockels cell based electro-optical modulator 216 receiving a control signal having a voltage amplitude of +/−20 kV, which is estimated to be within the safe operational range of a KDP crystal. The driving frequency of the control signal was 10 Hz, which is much lower than the maximum estimated driving frequency of 10 KHz.

Figure 5:
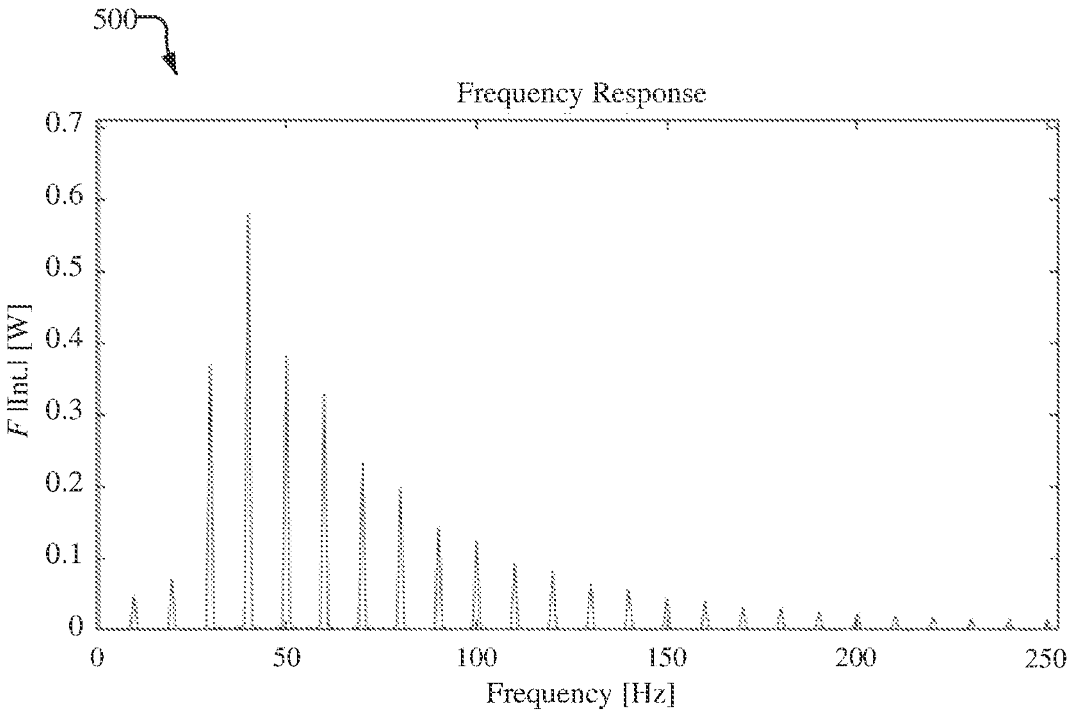
FIG. 5 shows a graph of a Fourier transform of the output signal from FIG. 4.

FIG. 5 is a graph 500 shows a Fourier transform of the output signal 402 from FIG. 4, with the magnitude of the Fourier transform normalized to the DC value (value at 0 Hz), illustrating the frequency response of the simulation of the output signal 402 of detector 116. Only 25 frequencies were generated in the simulation (all harmonics of the 10 Hz control signal) because the maximum frequency is dictated by the maximum driving voltage.

Figure 6:
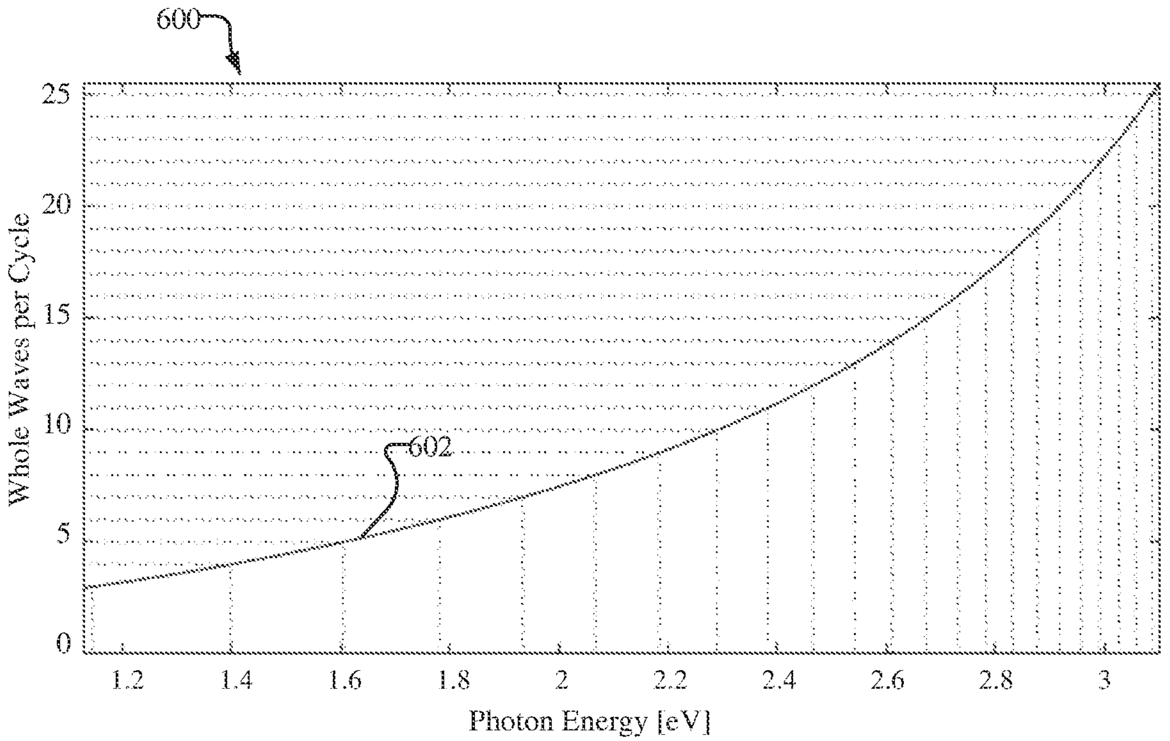
FIG. 6 shows a graph illustrating specific wavelengths that correspond to whole waves per cycle for the output signal from FIG. 4.

As discussed above, to avoid break down of the electro-optical modulator 216, the range of the control signal is limited in its operating range, which results in some wavelengths experiencing a perfect cycle within the voltage swing, while other wavelengths experience a phase discontinuity. FIG. 6, by way of example, is a graph 600 with curve 602 illustrating the specific wavelengths (in photon energy (eV) along the horizontal axis) that correspond to whole waves per cycle (along the vertical axis) for the output signal shown in FIG. 4, and, consequently, will not experience phase discontinuities.

Figure 7:
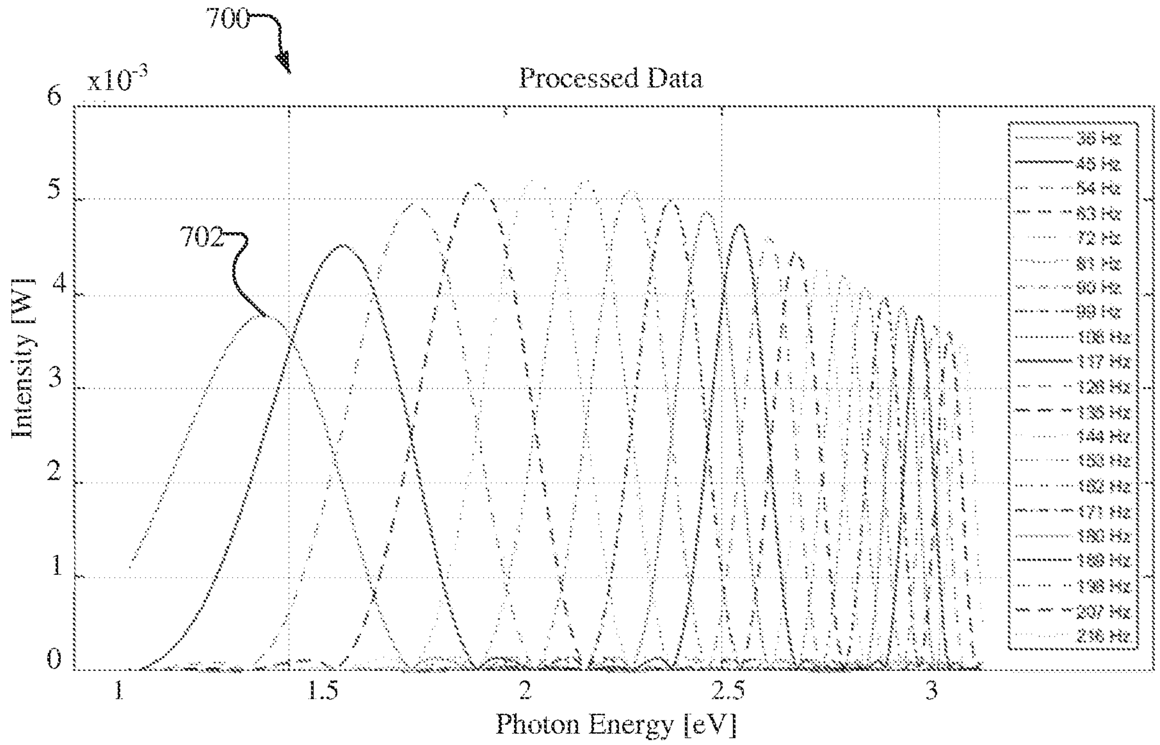
FIG. 7 shows a graph illustrating an example of the resulting wavelength-frequency multiplex produced by the output signal from FIG. 4.

FIG. 7 is a graph 700 illustrating an example of a wavelength-frequency multiplex produced by the wavelength modulator 200, e.g., resulting from the wavelength dependence of the wavelength modulator and the limited range of the control signal. The graph 700 shown in FIG. 7 is an example of the wavelength-frequency multiplex after processing, e.g., by performing a Fourier transform or Fast Fourier transform of the wavelength-frequency multiplex to obtain the wavelength spectrum information. Optional additional processing of the signal may include, e.g., calibration, noise reduction, and purification. Graph 700 illustrates different frequencies with separate curves, and shows the spread of the specific range of photon energies (which are inversely proportional to wavelength) corresponding to each frequency from graph 400 shown in FIG. 4. As can be seen in graph 700, the line-shape of the photon energy (equivalent to wavelengths) has a predictable distribution, but the phase discontinuities do not completely block other photon energies from contributing to a given temporal frequency, resulting in the illustrated wavelength to frequency multiplex. As can be seen, the intensity peak 702 in FIG. 7 is at a photon energy of ~1.4 eV, corresponding to a wavelength of 886 nm. In FIG. 6, the same photon energy (~1.4 eV), corresponding to 886 nm, falls on the curve 602 at exactly 4 whole waves per cycle. Thus, the result of measuring the output of the wavelength modulator 200 and generating a Fourier transform is the suppression of any non-whole waves, i.e., waves with discontinuities are suppressed.

During measurement, after the detector, e.g., detector 116 shown in FIG. 1, receives and detects the intensity in the resulting light from the sample 130 that is wavelength-frequency multiplexed. The wavelength-frequency multiple essentially gives each wavelength a frequency alias, so that whatever happens to a particular frequency must also be happening to the associated wavelength. One or more frequencies (equivalent to wavelengths) in the wavelength-frequency multiplex is detected in the resulting light. For example, the resulting light detected by the detector may have a waveform similar to that shown in FIG. 4, which is a function of intensity with respect to time. In some implementations, the resulting signal may be converted to the frequency domain to detect the wavelength-frequency multiplex in the received light. For example, in some implementations, one or more frequencies (equivalent to wavelengths) in the wavelength-frequency multiplex may be detected by performing a Fourier transform or Fast Fourier transform of the wavelength-frequency multiplex in the resulting light, e.g., thereby transforming the resulting light to a waveform similar to that shown in FIG. 7, which is a function of intensity with respect to photon energy (equivalent to wavelength) for each frequency. In some implementations, one or more lock-in amplifiers may be coupled to the detector 116, which may be used to detect a corresponding one or more frequencies in the received light. The one or more lock-in amplifiers, for example, are configured to lock on to specifically desired frequencies in the received light to extract the intensity of those frequencies.

During measurement, the detected intensity spectrum of the wavelength-frequency multiplex produced by light reflected from (or transmitted through) the sample may be compared to a modeled wavelength-frequency multiplex. The model wavelength-frequency multiplex, for example, may be produced by modeling the sample under test and calculating the wavelength intensity spectrum using physics-based techniques such as Rigorous Coupled Wave Analysis (RCWA), Finite-Difference Time-Domain (FDTD), Finite Element Method (FEM), etc. It should be understood that in some implementations, the frequency space may be used instead of wavelength space because the frequency and wavelength are comparable in the wavelength-frequency multiplex. The model of the sample includes preliminary structural and material information and may include one or more variable parameters. The preliminary structural and material information for a sample, for example, may include the type of structure and a physical description of the sample with nominal values for various fixed and variable parameters, such as layer thicknesses, line widths, space widths, sidewall angles, etc., along with a range within which variable parameters may change. A library of modeled data for a plurality of variations in the model may be pre-generated to improve measurement throughput, but in some instances the modeled data may be calculated in real time. The measured wavelength-frequency multiplex (e.g., measured amplitude of a plurality of frequencies which is equivalent to the intensity of the plurality of wavelengths associated with the plurality of frequencies) is compared to the modeled wavelength-frequency multiplex for each parameter variation, e.g., in a nonlinear regression process, until a good fit is achieved between the modeled wavelength-frequency multiplex and the measured wavelength-frequency multiplex, e.g., which may be determined based on the means square error (MSE). When a good fit is achieved, the model parameters corresponding to the modeled wavelength-frequency multiplex with the best fit may be considered to be an accurate representation of the parameters of the sample. Moreover, in addition to modeling the wavelength-frequency multiplex (the data) directly, in some implementations, such as when the metrology tool is a spectroscopic ellipsometer, the data may be converted into another form, such as Psi & Delta, or Mueller matrix elements, or reflectivity, and the resulting spectra may be modeled. During measurement, methods other than modeling, such as machine learning, may be used to determine parameters of a sample. In other methods, for example, the output of light sources, such as LEDs, may be the parameter to be determined, which may be measured directly without modeling. In general, for any given metrology tool that does not directly measure the data of interest but uses modeling, the "choice" of whether to model the data directly or to first purify the data by removing effects from the system via calibration or normalizing techniques is a tool by tool or even measurement by measurement decision.

Figure 8:
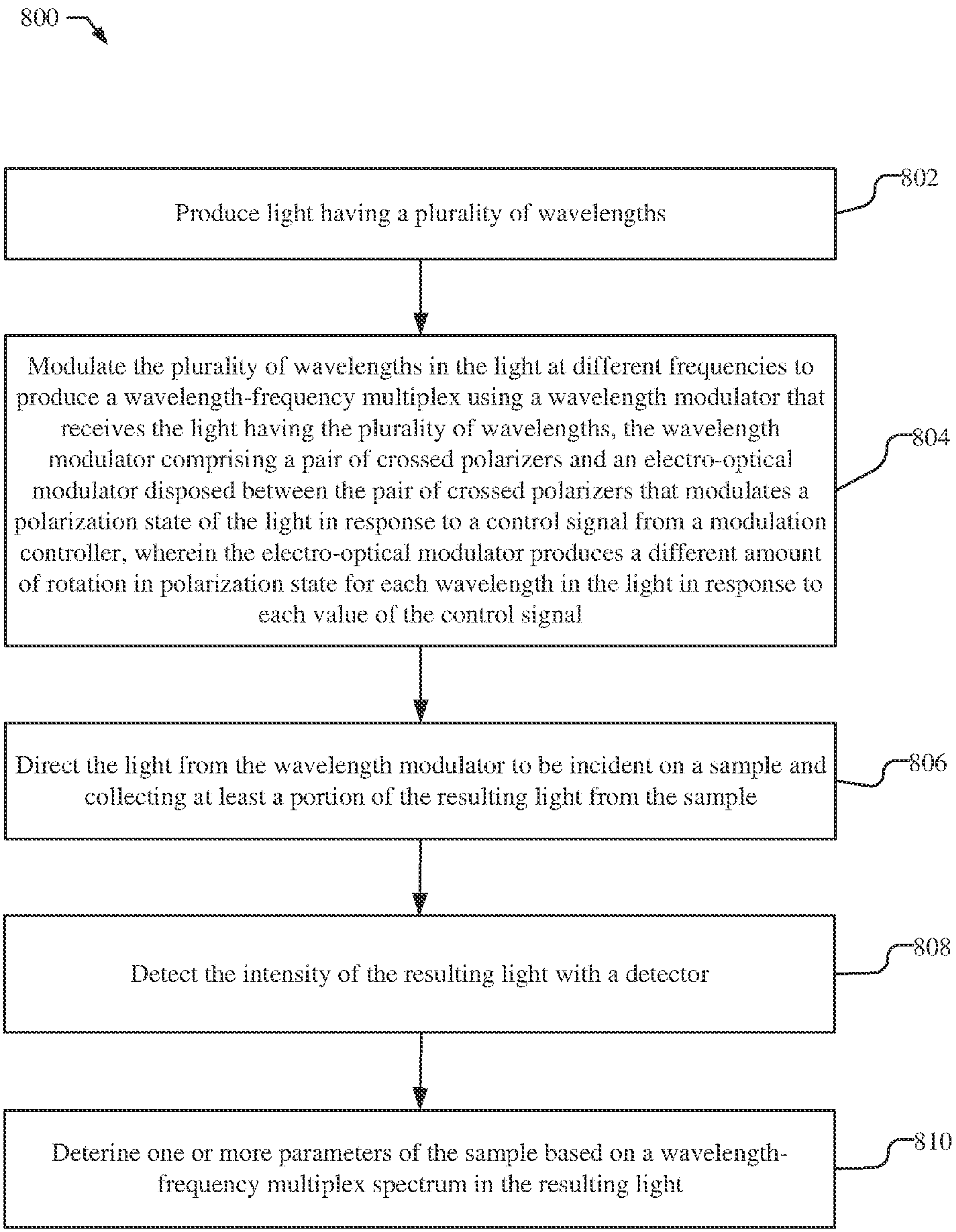
FIG. 8 shows a flowchart depicting a method for characterizing a sample using a wavelength modulator.

FIG. 8 shows an illustrative flowchart depicting an example method 800 for characterizing a sample using a wavelength modulator, according to some implementations. In some implementations, the example method 800 may be performed by the optical metrology device 100 shown in FIG. 1 using the wavelength modulator 200 shown in FIG. 2.

At 802, light is produced with a plurality of wavelengths, as discussed in reference to light source 106 in FIG. 1 and light source 202 in FIG. 2.

At 804, the plurality of wavelengths in the light are modulated at different frequencies to produce a wavelength-frequency multiplex using a wavelength modulator that receives the light having the plurality of wavelengths, as discussed in reference to wavelength modulator 105 in FIG. 1 and wavelength modulator 200 shown in FIG. 2. The wavelength modulator includes a pair of crossed polarizers and an electro-optical modulator disposed between the pair of crossed polarizers as illustrated in FIG. 2. In some implementations, the electro-optical modulator may be one of a Pockels cell and a Faraday rotator, as discussed in reference to FIG. 2. The electro-optical modulator modulates a polarization state of the light in response to a control signal from a modulation controller, wherein each wavelength in the light the electro-optical modulator produces a different amount of rotation in polarization retardance in response to each value of the control signal.

At 806, the light from the wavelength modulator is directed to be incident on a sample and at least a portion of the resulting light from the sample is collected, e.g., as discussed in reference to optical system 104 and objective 112 in FIG. 1.

At 808, the intensity of the resulting light is detected with a detector, as discussed in reference to detector 116 in FIG. 1.

At 810, one or more parameters of the sample are determined based on the wavelength-frequency multiplex spectrum in the resulting light. For example, detected intensity of light may be provided to at least one processor 162, which may use the wavelength-frequency multiplex spectrum in the resulting light to determine one or more parameters of the sample. In some implementations, the means for determining one or more parameters of the sample based on the wavelength-frequency multiplex spectrum in the resulting light may be, e.g., the at least one processor 162 that may be configured based on computer-readable program code 166 stored in memory 164.

In some implementations, the method may further include performing a Fourier transform of the wavelength-frequency multiplex spectrum in the resulting light to detect wavelength data, e.g., as discussed in reference to FIGS. 4-7, where the one or more parameters of the sample are determined based on the wavelength data. A means for performing a Fourier transformation of the wavelength-to frequency multiplex spectrum in the resulting light to detect wavelength data may be, e.g., the at least one processor 162 that may be configured based on computer-readable program code 166 stored in memory 164.

In some implementations, the method may further include locking on to one or more frequencies in the wavelength-frequency multiplex spectrum in the resulting light with a corresponding one or more lock-in amplifiers to extract wavelength data, e.g., as discussed in reference to FIGS. 4-7, where the one or more parameters of the sample are determined based on the wavelength data. A means for locking on to one or more frequencies in the wavelength-frequency multiplex spectrum in the resulting light with a corresponding one or more lock-in amplifiers to extract wavelength data may be, e.g., the one or more lock-in amplifiers 117 illustrated in FIG. 1.

In some implementations, the one or more parameters of the sample may be determined based on the amplitude of one or more wavelengths in the wavelength-frequency multiplex in the resulting light.

In some implementations, the wavelength modulator is located between the light source and the sample, as illustrated in FIG. 1.

In some implementations, the control signal is a repeating signal having a maximum amplitude selected based on a break down characteristic of a crystal in the electro-optical modulator, e.g., as discussed in reference to FIGS. 4-7.

The above description is intended to be illustrative, and not restrictive. For example, the above-described examples (or one or more aspects thereof) may be used in combination with each other. Other implementations can be used, such as by one of ordinary skill in the art upon reviewing the above description. Also, various features may be grouped together and less than all features of a particular disclosed implementation may be used. Thus, the following aspects are hereby incorporated into the above description as examples or implementations, with each aspect standing on its own as a separate implementation, and it is contemplated that such implementations can be combined with each other in various combinations or permutations. Therefore, the spirit and scope of the appended claims should not be limited to the foregoing description.

What is claimed is:

1. An optical metrology device, comprising:

a light source that continuously produces light having a plurality of wavelengths;

a wavelength modulator that receives the light having the plurality of wavelengths, the wavelength modulator comprising a pair of crossed polarizers and an electro-optical modulator disposed between the pair of crossed polarizers that modulates a polarization state of the light in response to a control signal, wherein the electro-optical modulator produces a different amount of rotation in polarization state for each wavelength in the light in response to each value of the control signal;

a modulation controller that is communicatively coupled to the electro-optical modulator and provides the control signal to the electro-optical modulator to modulate an intensity of the plurality of wavelengths in the light at different modulation frequencies, with each wavelength mapped to a different modulation frequency, to produce a wavelength-frequency multiplex;

illumination optics and collection optics configured to direct the light from the wavelength modulator to be incident on a sample and to collect at least a portion of resulting light from the sample;

a detector configured to detect intensity of the resulting light; and at least one processor coupled to the detector, the at least one processor is configured to determine one or more parameters of the sample based on an intensity of the wavelength-frequency multiplex in the resulting light.

2. The optical metrology device of claim 1, wherein the at least one processor is configured to perform a Fourier transform of the intensity of the wavelength-frequency multiplex in the resulting light to detect wavelength data and the one or more parameters of the sample are determined based on the wavelength data.

3. The optical metrology device of claim 1, further comprising one or more lock-in amplifiers coupled to the detector that are configured to extract wavelength data for a corresponding one or more wavelengths in the intensity of the wavelength-frequency multiplex in the resulting light and the one or more parameters of the sample are determined based on the wavelength data.

4. The optical metrology device of claim 1, wherein the at least one processor is configured to determine the one or more parameters of the sample based on the intensity of one or more wavelengths in the wavelength-frequency multiplex in the resulting light.

5. The optical metrology device of claim 1, wherein the electro-optical modulator comprises one of a Pockels cell and a Faraday rotator.

6. The optical metrology device of claim 1, wherein the wavelength modulator is located between the light source and the sample.

7. The optical metrology device of claim 1, wherein the wavelength modulator is located between the sample and the detector.

8. The optical metrology device of claim 1, wherein the control signal is a repeating signal having a maximum amplitude selected based on a break down characteristic of a crystal in the electro-optical modulator.

9. A method performed by an optical metrology device, comprising:

producing light continuously with a plurality of wavelengths;

modulating an intensity of the plurality of wavelengths in the light at different modulation frequencies, with each wavelength mapped to a different modulation frequency, to produce a wavelength-frequency multiplex using a wavelength modulator that receives the light having the plurality of wavelengths, the wavelength modulator comprising a pair of crossed polarizers and an electro-optical modulator disposed between the pair of crossed polarizers that modulates a polarization state of the light in response to a control signal from a modulation controller, wherein the electro-optical modulator produces a different amount of rotation in polarization state for each wavelength in the light in response to each value of the control signal;

directing the light from the wavelength modulator to be incident on a sample and collecting at least a portion of resulting light from the sample;

detecting an intensity of the resulting light with a detector; and determining one or more parameters of the sample based on an intensity of the wavelength-frequency multiplex in the resulting light.

10. The method of claim 9, further comprising performing a Fourier transform of the intensity of the wavelength-frequency multiplex in the resulting light to detect wavelength data, wherein determining the one or more parameters of the sample is based on the wavelength data.

11. The method of claim 9, further comprising locking on to one or more modulation frequencies in the intensity of the wavelength-frequency multiplex in the resulting light with a corresponding one or more lock-in amplifiers to extract wavelength data, wherein determining the one or more parameters of the sample is based on the wavelength data.

12. The method of claim 9, wherein the one or more parameters of the sample are determined based on the intensity of one or more wavelengths in the wavelength-frequency multiplex in the resulting light.

13. The method of claim 9, wherein the electro-optical modulator comprises one of a Pockels cell and a Faraday rotator.

14. The method of claim 9, wherein the wavelength modulator is located between a light source and the sample.

15. The method of claim 9, wherein the wavelength modulator is located between the sample and the detector.

16. The method of claim 9, wherein the control signal is a repeating signal having a maximum amplitude selected based on a break down characteristic of a crystal in the electro-optical modulator.

* * * * *